US008414181B2

(12) United States Patent
Liet

(10) Patent No.: US 8,414,181 B2
(45) Date of Patent: Apr. 9, 2013

(54) APPARATUS FOR PROCESSING MATERIAL, SUCH AS A BIOMASS OR FEED FOR CATTLE, HAVING A ROTATING DISC MOUNTED TO ROTATING COLUMN

(75) Inventor: Cornelis Hendricus Liet, Losser (NL)

(73) Assignee: Trioliet Holding B.V., Oldenzaal (NL)

( * ) Notice: Subject to any disclaimer, the term of this patent is extended or adjusted under 35 U.S.C. 154(b) by 0 days.

(21) Appl. No.: 12/528,708

(22) PCT Filed: Jan. 15, 2007

(86) PCT No.: PCT/NL2007/050015
§ 371 (c)(1),
(2), (4) Date: Aug. 26, 2009

(87) PCT Pub. No.: WO2007/083998
PCT Pub. Date: Jul. 26, 2007

(65) Prior Publication Data
US 2010/0195433 A1 Aug. 5, 2010

(30) Foreign Application Priority Data

Jan. 17, 2006 (NL) .................................... 1030925
Aug. 17, 2006 (NL) .................................... 2000187

(51) Int. Cl.
*B01F 7/24* (2006.01)
(52) U.S. Cl. ........ 366/301; 366/312; 366/314; 366/319; 366/603
(58) Field of Classification Search .................. 366/302, 366/306, 307, 314, 318–324, 603, 301, 312; 241/101.76, 101.761, 101.8, 260.1, 605
See application file for complete search history.

(56) References Cited

U.S. PATENT DOCUMENTS

| 7,347,616 B2 * | 3/2008 | Albright ........................ 366/314 |
| 2004/0008575 A1 | 1/2004 | Albright et al. |
| 2009/0277340 A1 * | 11/2009 | Liet ................................. 99/485 |

(Continued)

FOREIGN PATENT DOCUMENTS

| CA | 2307962 A1 | 10/2001 |
| DE | 19829867 A1 * | 1/2000 |

(Continued)

OTHER PUBLICATIONS

Official Search Report of the European Patent Office in counterpart foreign application No. PCT/NL2007/050015 filed Jan. 15, 2007.

(Continued)

*Primary Examiner* — Charles E Cooley
(74) *Attorney, Agent, or Firm* — Steven M. Koehler; Westman, Champlin & Kelly P.A.

(57) ABSTRACT

An apparatus for processing material, such as a biomass or fodder for cattle, comprises a container having a bottom and an upright wall, and at least one mixing element comprising an upright column and a mixing blade attached to the column. A front edge of the mixing element at least is proximate to the bottom of the container. The mixing element with its column is rotatably mounted in the container and can be coupled to a drive unit. The mixing blade comprises an element which is rotatably supported on a carrier that is fixed to the column. A part of the circumferential edge of the rotatable element may form the front edge and the part of the outer edge of the mixing blade that joins said front edge.

23 Claims, 6 Drawing Sheets

U.S. PATENT DOCUMENTS

| | | | |
|---|---|---|---|
| 2009/0296517 A1* | 12/2009 | Tamminga | 366/314 |
| 2010/0195433 A1* | 8/2010 | Liet | 366/310 |
| 2011/0110184 A1* | 5/2011 | Liet | 366/310 |

FOREIGN PATENT DOCUMENTS

| | | |
|---|---|---|
| DE | 29911066 | 12/2000 |
| DE | 20305983 | 6/2003 |
| DE | 20315988 | 1/2004 |
| DE | 202004011784 | 7/2004 |
| DE | 202004011784 | 10/2004 |
| EP | 0943236 A | 9/1999 |
| EP | 1082895 | 9/2000 |
| EP | 1082895 A1 * | 3/2001 |
| EP | 1082896 A | 3/2001 |
| EP | 1082896 A1 * | 3/2001 |
| EP | 1224859 | 7/2002 |
| EP | 1224859 A1 * | 7/2002 |
| EP | 1417999 A | 5/2004 |
| EP | 1417999 A2 * | 5/2004 |
| FR | 2810197 | 12/2001 |
| FR | 2810197 A1 * | 12/2001 |
| GB | 2310793 | 9/1997 |
| NL | 1014571 | 9/2001 |
| WO | 2007/037693 A2 * | 4/2007 |
| WO | WO 2007037693 A2 | 4/2007 |
| WO | 2007/083998 A1 * | 7/2007 |
| WO | WO 2007083998 A1 | 7/2007 |

OTHER PUBLICATIONS

Written Opinion of the European Patent Office in counterpart foreign application No. PCT/NL2007/050015 filed Jan. 15, 2007.

European Search Report of the European Patent Office Patent Office in foreign application No. NL 2003769 filed Nov. 6, 2009.

Non-final Office Action, U.S. Appl. No. 12/940,865, filed Nov. 5, 2010, mail date Aug. 3, 2011, 14 pages.

Final Office Action, U.S. Appl. No. 12/940,865, filed Nov. 5, 2010, mail date Feb. 14, 2012, 14 pages.

* cited by examiner

APPARATUS FOR PROCESSING MATERIAL, SUCH AS A BIOMASS OR FEED FOR CATTLE, HAVING A ROTATING DISC MOUNTED TO ROTATING COLUMN

CROSS REFERENCE TO RELATED APPLICATION

The present application is a national stage filing of International patent application Serial No. PCT/NL2007/050015, filed Jan. 15, 2007, and published as WO 2007/083998 in English.

BACKGROUND

The discussion below is merely provided for general background information and is not intended to be used as an aid in determining the scope of the claimed subject matter.

Aspects of the invention relate to an apparatus for processing material, such as a biomass or fodder for cattle, comprising a container having a bottom and an upright wall, and at least one mixing element comprising an upright column and a mixing blade attached to the column, a front edge of which at least substantially joins the bottom of the container, which mixing element is rotatably mounted in the container.

Such an apparatus and mixing element are known, for example from EP-A-0 943 236. A problem that occurs with the known apparatus is that the front edge and the adjoining part of the outer edge of the mixing blade push up the fodder that is present in the container during rotation of the mixing element, with the fodder sliding over the bottom of the container instead of moving upwards over the mixing blade. This results in a reduced mixing action of the mixing element. In addition, the mixing element is usually provided with knives along the outer edge of the mixing blade for cutting the fodder. To obtain an optimum cutting action, the difference in speed between the fodder and the rotating mixing element must be as great as possible. If the fodder is carried along at substantially the same speed by the mixing element, the cutting action will be minimal. The cutting efficiency of the known apparatus is low, and a high power level is required for reducing the fodder to a sufficient extent.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the background.

According to an aspect of the invention includes a mixing blade that comprises an element which is rotatably supported on a carrier that is fixed to the column. In this way an apparatus is obtained wherein the rotatable element significantly reduces the friction between the fodder and mixing blade, so that a considerable energy-saving is realized upon processing the fodder. Furthermore, the discharge of the feed mixture via the delivery opening in the wall of the container is improved in that more radially directed forces are exerted on the fodder. In addition, a comparatively large difference in speed is realized between the fodder and the rotating mixing element, as a result of which the cutting action of the mixing element is significantly improved.

According to an advantageous embodiment, the rotatable element is disposed in the lower half, preferably in the lower third part of the mixing blade. According to one embodiment, the rotatable element is disposed at the beginning of the mixing blade near the bottom of the container, wherein a part of the circumferential edge of the rotatable element forms the front edge and the part of the outer edge of the mixing blade that joins said front edge. The rotatable element forms the entry part of the mixing blade, as a result of which the fodder is picked up, as it were, and placed on the adjoining part of the mixing blade or, if more than one rotatable element is used, on the next rotatable element. In this way the feed-in of the fodder into the mixing blade is improved.

An aspect of the invention also provides a mixing element comprising an upright column and a mixing blade having a front edge and an outer edge, which is attached to the column. The mixing blade is provided with an element that is rotatably supported on the mixing blade.

BRIEF DESCRIPTION OF THE DRAWINGS

Aspects of the invention will be explained in more detail hereinafter with reference to the drawing, which shows a few very schematic views of embodiments of the apparatus.

DETAILED DESCRIPTION OF THE ILLUSTRATIVE EMBODIMENT

Figure 1:
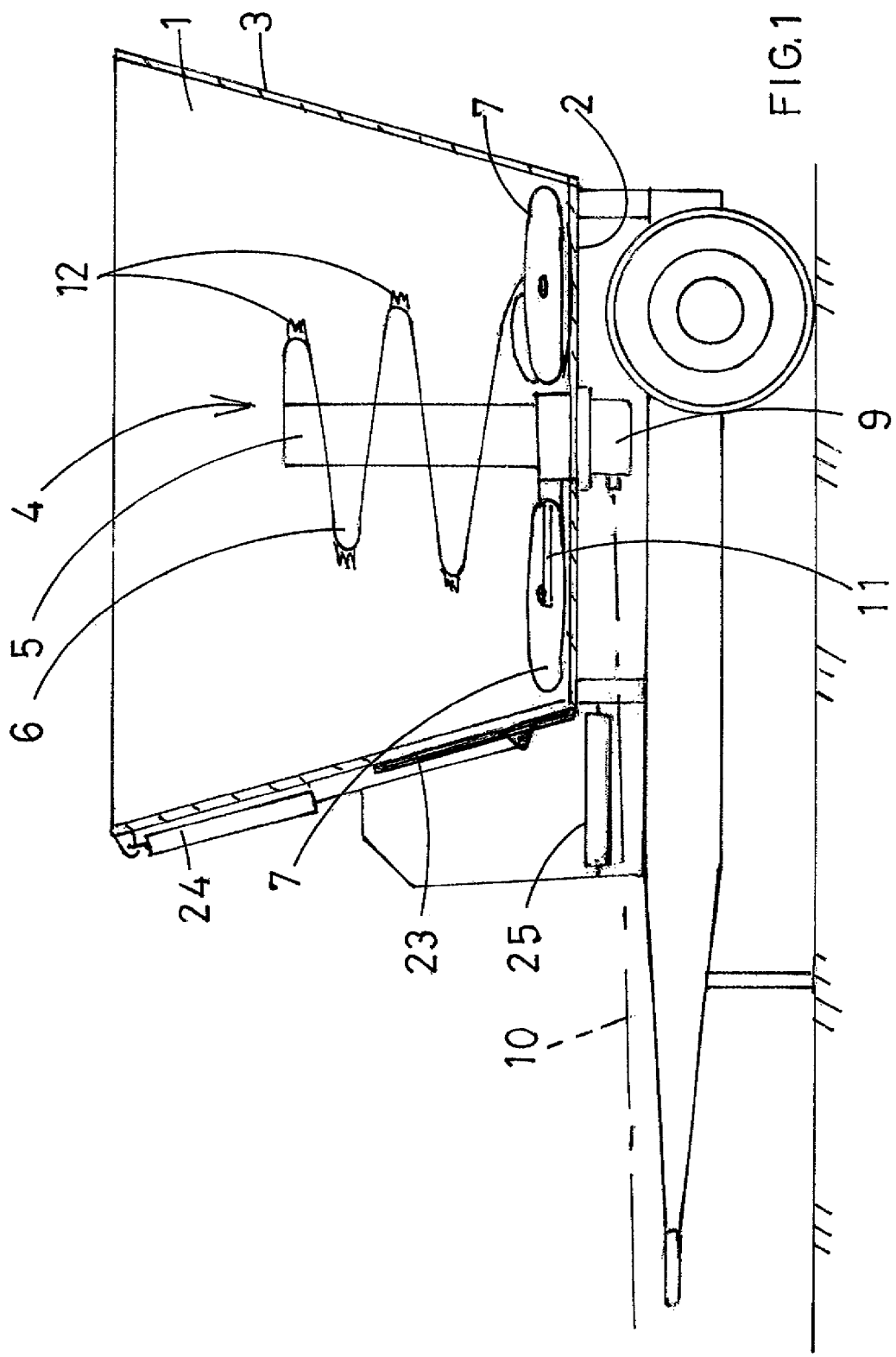
FIG. 1 is a schematic side elevation, partially in sectional view, of an embodiment of the apparatus according to an aspect of the invention.
Figure 2:
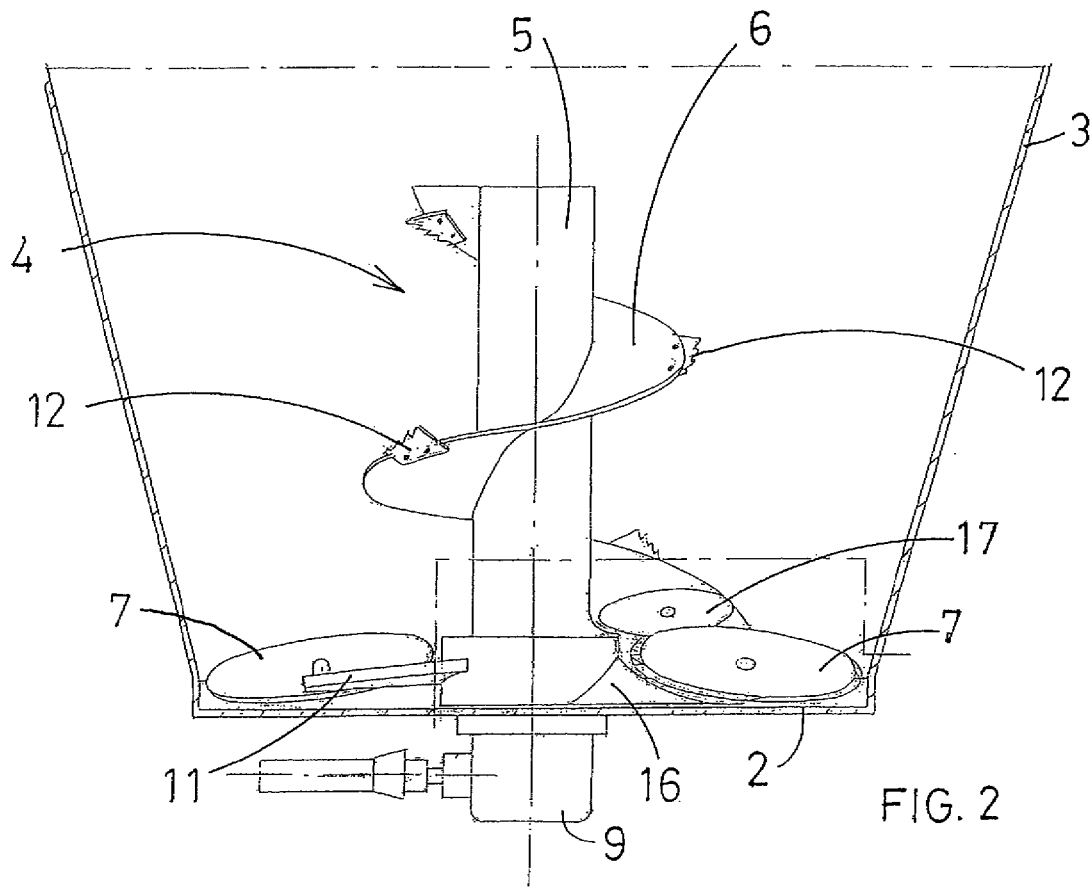
FIG. 2 shows the container of the apparatus of FIG. 1, partially in sectional view, which is provided with a mixing element according to one embodiment of the invention.

FIG. 1 very schematically shows an apparatus for processing fodder for cattle, which comprises a container 1 having a bottom 2 and an upright wall 3. The apparatus is also suitable for processing other materials, such as a bio-mass. Mounted in the container 1 is a mixing element 4 comprising an upright column 5 and a helically extending mixing blade 6 that is attached to the column. The container and the mixing element 4 are shown in more detail in FIG. 2, which clearly shows that the entry part of the helical mixing blade 6 is formed by a disc 7 that is rotatably supported on the mixing blade. It is noted that also differently configured rotatable elements may be used. The diameter of the disc 7 or the radial dimension of a rotatable element corresponds at least substantially to the radial dimension of the mixing blade. As a result, the surface of the mixing blade 6 at the location of a disc 7 is substantially formed by the surface of the disc. A part of the circumferential edge of the disc 7 forms the front edge and the part of the outer edge of the mixing blade 6 that joins said front edge. The lowermost part of the circumference of the disc 7 is indicated at 8 in FIG. 3. As is shown in FIG. 2, the disc 7 is supported on the mixing blade 6 in such a manner that the part 8 is spaced a small distance from the bottom 2 of the container 1, whilst the opposite arcuate part of the disc 7 is positioned higher. Alternatively, the disc 7 may extend substantially horizontally.

The mixing element 4 is mounted in the container 1, its column 5 being rotatable about an axis that extends upwards from the bottom of the container (indicated at 5A in FIG. 3), and can be coupled to a drive unit 9, which can be driven from the power take-off shaft of a tractor (not shown), as is schematically indicated by a dashed line 10 in FIG. 1. It is noted that it is of course also possible to use other constructions for rotatably and drivably supporting the mixing element in the container 1.

Figure 3:
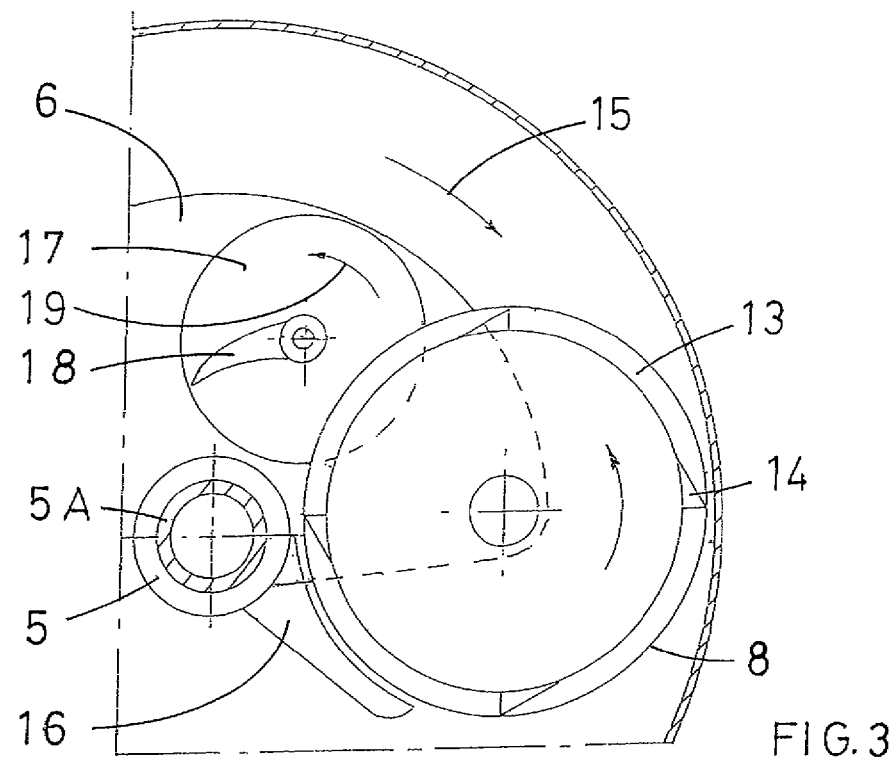
FIG. 3 shows a part of a horizontal sectional view of the container of FIG. 2.

In the embodiment that is shown in FIGS. 1-3, the mixing element 4 is provided with a mixing arm 11, which projects from the column 5 approximately diametrically opposite the disc 7, on which arm 11 a disc 7 is likewise rotatably supported. Also in the case of this mixing arm 11, a part of the circumferential edge of the disc 7 forms the front edge and the outer edge of the mixing arm 11, and the disc 7 extends obliquely upwards. The disc 7 of the mixing arm 11 may also extend substantially horizontally. In FIGS. 1 and 2 the mixing blade 6 is provided with a number of knife elements 12, which are fixed to the mixing blade 6 and which project from said mixing blade.

The discs 7 have a bevelled circumferential part 13, on which carrier elements 14 are mounted, which enable a better engagement of the disc 7 on the fodder to be processed. The disc or discs 7 may also have a sharp outer circumferential edge, so that the discs can act as knives. The discs 7 of the embodiments described herein are flat. Alternatively, the discs may also be slightly spherical or conical in shape.

Seen in the direction of rotation of the mixing element 4, which direction is indicated by an arrow 15 in FIG. 3, a guide plate 16 is disposed in front of the disc 7 of the mixing blade 6, which guide plate is fixed to the column and which extends in substantially radially outward direction. The guide plate 16 carries the fodder from the central part towards the outer side, so that the fodder can be picked up by the disc 7. The guide plate 16 at least substantially joins the circumference of the disc 7 with an arcuate edge thereof.

Figure 5:
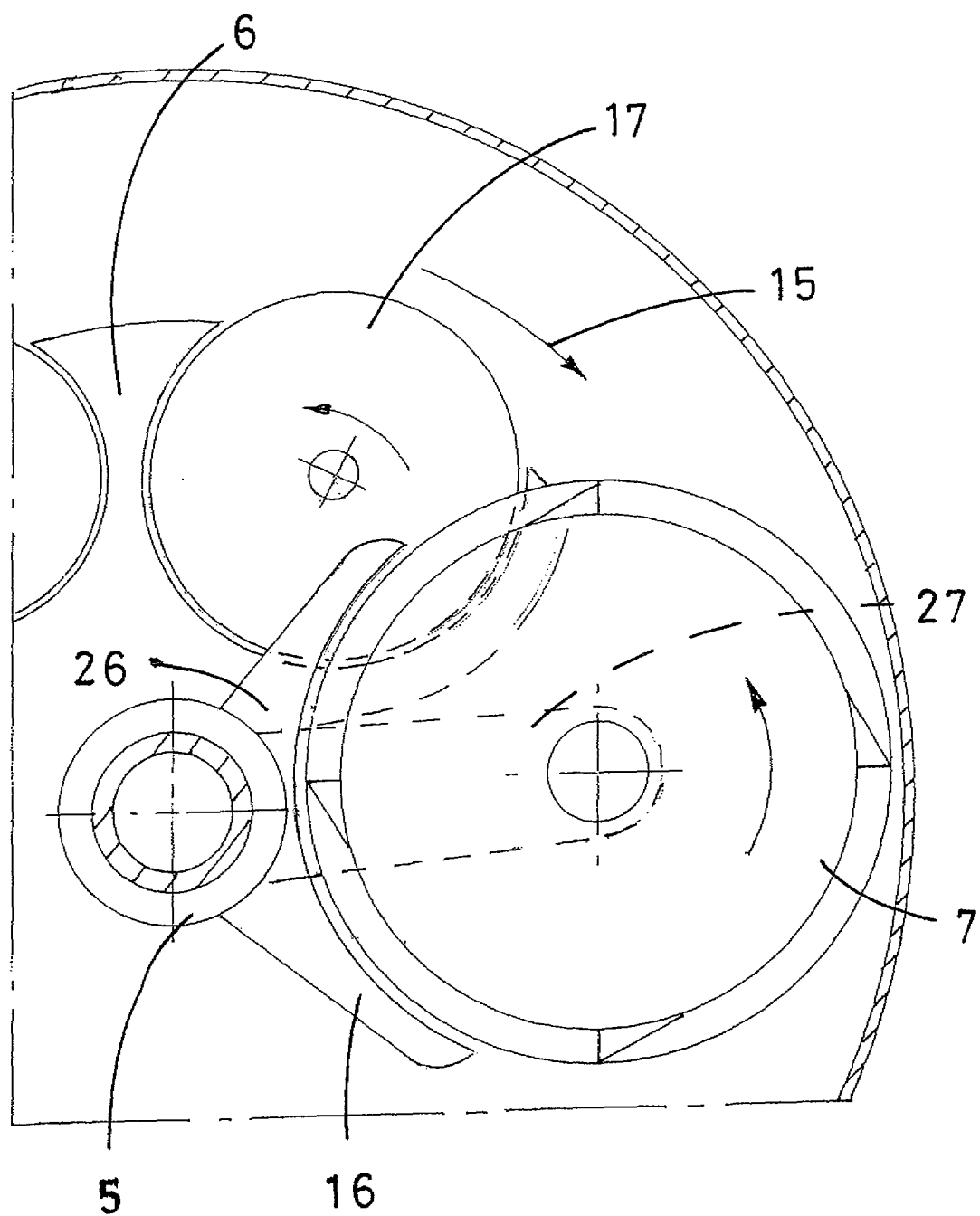
FIG. 5 is a horizontal sectional view corresponding to FIG. 3 of a variant of the apparatus according to an aspect of the invention.

FIG. 5 is a sectional view corresponding to FIG. 3 of an embodiment of the apparatus according to an aspect of the invention, which is configured in substantially the same manner as the apparatus that is shown in FIGS. 1-3. In this embodiment, a scraper element 26 is provided at the rear side of the disc 7. Said scraper or stripper element removes any fodder that may be carried along by the circumference of the disc 7, so that the disc will remain free from fodder and will continue to be freely rotatable. As is illustrated in a dashed line, the disc 7 is rotatably supported on an arm 27, which is connected to the column 5.

In the embodiment that is shown in FIGS. 1-3, a second disc 17 is mounted to the mixing blade 7, which disc 17 is positioned partially below the disc 7. This means that in this embodiment the disc 7 transfers the fodder to the second disc 17, which in turn transfers the fodder to the mixing blade 6. As FIG. 3 furthermore shows, a pusher element 18 is mounted on the shaft of the disc 17. Said pusher element 18 is fixedly connected to said shaft and consequently it is stationary with respect to the rotatable disc. This facilitates the transfer of the fodder from the disc 17 to the mixing blade 6.

In the embodiment that is shown in FIG. 5, the second disc 17 is incorporated in the mixing blade 6, so that the surface of the disc 17 at least partially coincides with the surface of the mixing blade 6.

Figure 6:
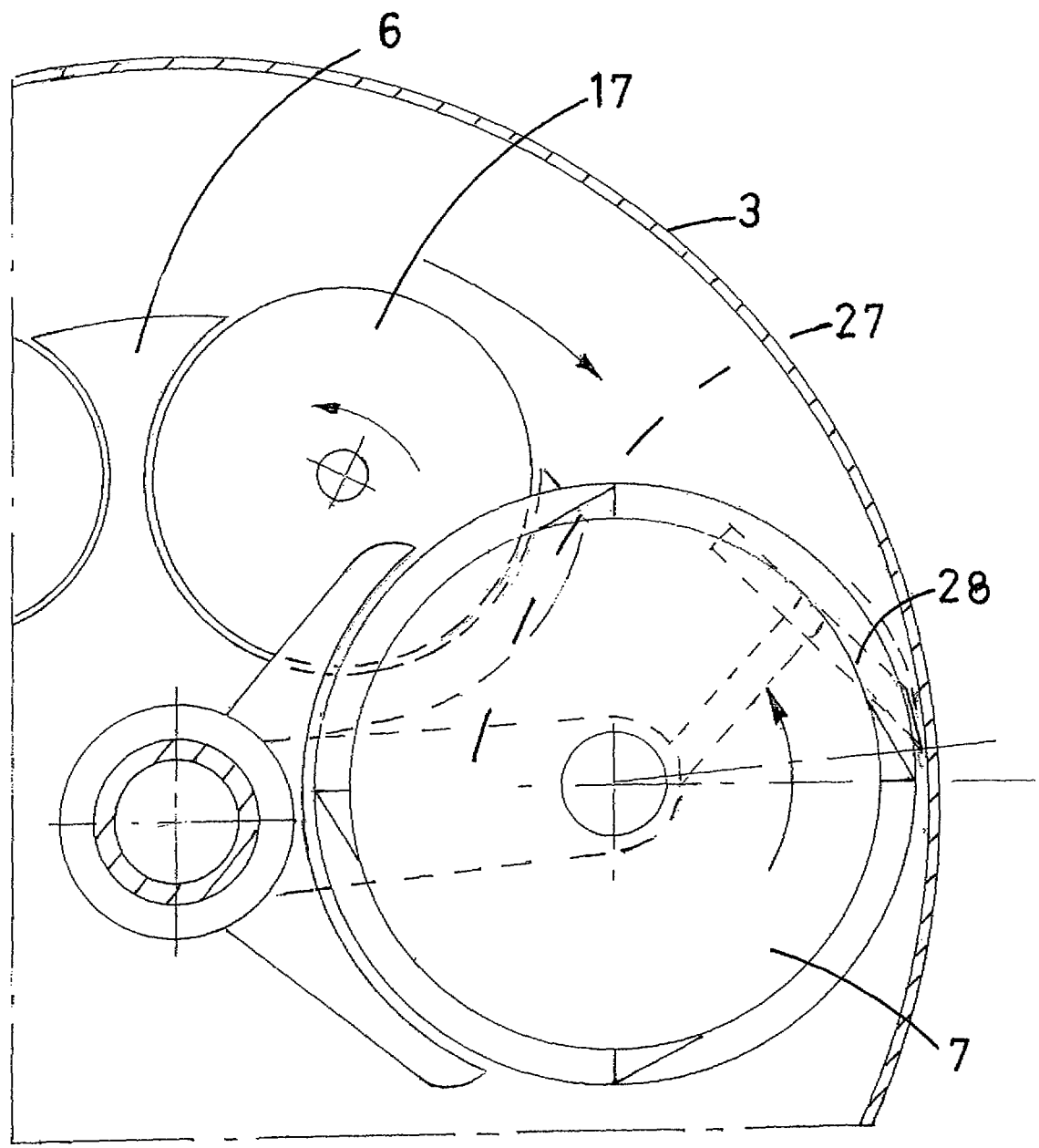
FIG. 6 is a horizontal sectional view corresponding to FIG. 5 of another variant of the apparatus according to an aspect of the invention.

FIG. 6 is a sectional view corresponding to FIG. 5 of an apparatus according to an aspect of the invention, in which the arm 27 carries another scraper 28. The free end of the scraper 28 is positioned closer to the wall 3 of the container 1 than the circumference of the disc 7. The scraper 28 guides fodder that lands between the disc 7 and the wall 3 or under the disc 7 in the direction of the column 5, so that said fodder is reintroduced into the mixing process. The scraper 28 preferably extends at an angle to the wall 3.

Figure 7:
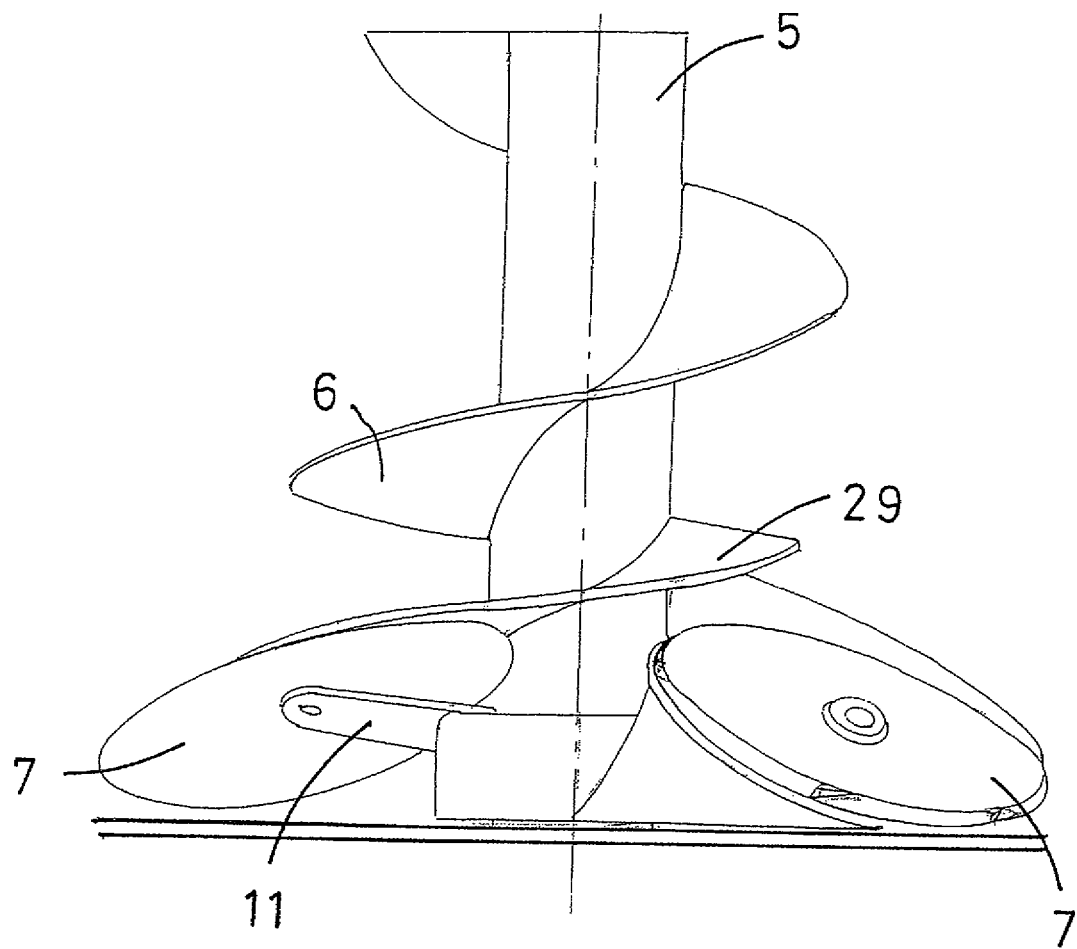
FIG. 7 shows a part of a sectional view of an embodiment of the apparatus according to an aspect of the invention in which a variant of the mixing element is used.

FIG. 7 shows an embodiment of the apparatus according to an aspect of the invention in which a second helical mixing blade 29 joins the mixing arm 11 that carries the second disc 7. The second disc 7 may in this case also be mounted to the second mixing blade 29 itself, of course. The second mixing blade 29 extends over a length of, for example, at least 180 degrees. The fodder is picked up by the second disc 7 and placed on the mixing blade 29, which subsequently deposits the fodder on the mixing blade 6 and the disc 7. This results in an improved mixing action of the mixing element. using the present apparatus, one or more bales of fodder, such as grass silage and any other types of fodder, is (are) deposited into the container 1, after which the mixing element 4 is driven to rotate in the direction indicated by the arrow 15. The friction between the discs 7 and the fodder causes the discs 7, 17 to rotate in the direction indicated by the arrows 19. As a result, the sufficiently reduced fodder is easily picked up by the lowermost part 8 of the discs 7 and delivered to the next disc 17 or, in the absence thereof, to the mixing blade 6. This facilitates the introduction of the fodder into the helical mixing blade 6. In addition, the fodder that is present in the container 1 is at least substantially stationary with respect to the rotating mixing element 4, as a result of which the knife elements 12 cut relatively quickly through the fodder in the container. In this way the cutting action of the mixing element 4 is significantly improved. The cutting efficiency of the present apparatus is high, as a result of which a considerable energy saving in the processing of the fodder is realised.

Figure 4:
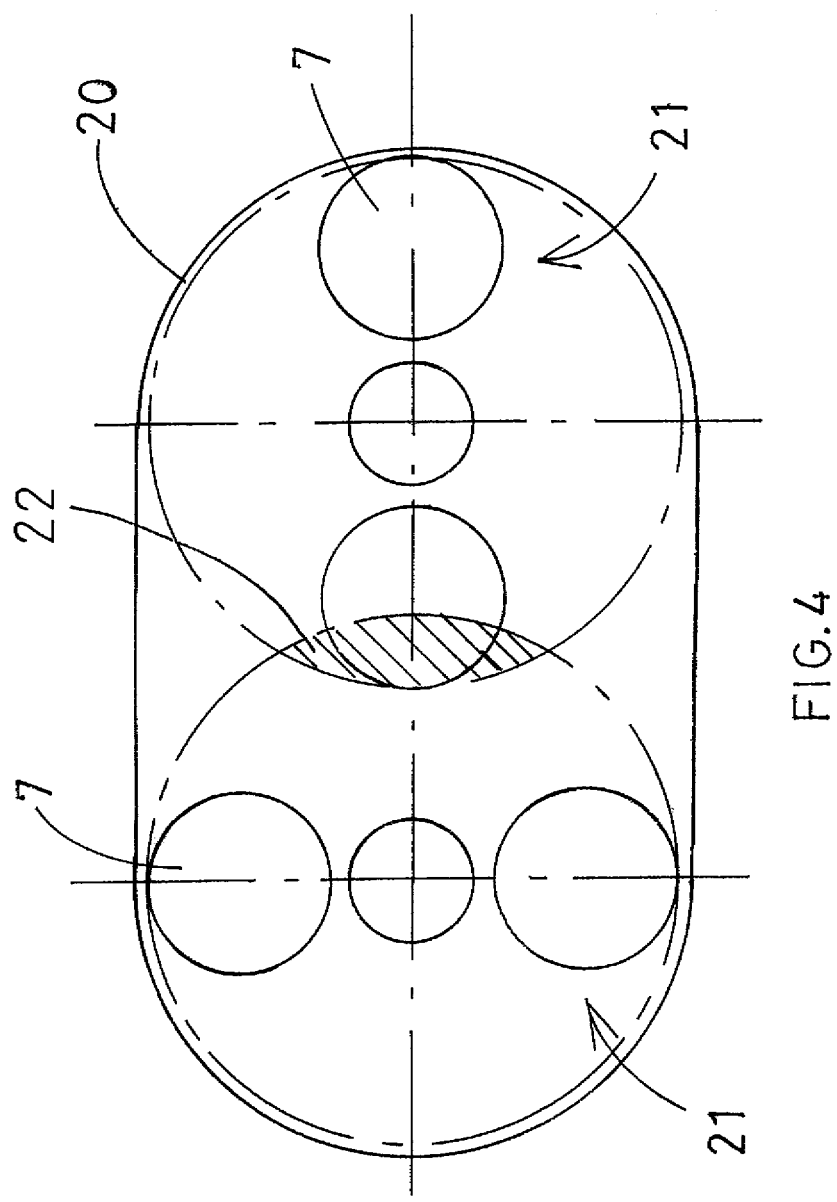
FIG. 4 is a schematic plan view of the container of a second embodiment of the apparatus according to an aspect of the invention, which is fitted with two mixing elements.

FIG. 4 shows a plan view of a container 20 of a second embodiment of the apparatus, which comprises two mixing elements 21. Said mixing elements 21 are configured in the same manner as the above-described mixing element 4. As this plan view shows, the paths of the discs 7 overlap in the hatched part 22. When the discs 7 move through this part 22 during the mixing of the fodder in the container 20, they deposit part of the picked-upper fodder behind the disc 7 in this part, where it can be picked up by the disc 7 of the other mixing elements 21. This leads to a significantly improved mixing action of the mixing elements 21 in the longitudinal direction of the container 20.

In the embodiment that is shown in FIG. 1, the container 1 is provided with a metering flap 23, which can be opened by means of an actuating element such as actuator 24. The metering flap 23 closes the delivery opening (not shown) in the wall 3 of the container, so that the fodder is discharged from the container 1 in the open position of the metering flap 23 and delivered to a cross conveyor 25. The fodder is discharged from the container 1 by the rotation of the mixing element 4. The discs 7, 17 may be decelerated or be stopped entirely to enable removal of the fodder from the container 1. Means (not shown) are provided for this purpose. It is also possible to activate the means for decelerating or stopping the disc or discs 7, 17 for the purpose of removing the last part of the fodder from the container 1.

In one variant (not shown), the wall 3 of the container 1 may also be provided on one side or on both sides with a delivery opening fitted with a metering flap, so that a cross conveyor is not needed. Experiments carried out with the apparatuses described herein showed that the delivery of the feed mixture takes place substantially in radial direction relative to the direction of rotation of the mixing element, as a result of which an even and correctly metered delivery of the feed mixture is possible. With the known apparatus, which has a mixing element not provided with discs, the direction of movement of the feed mixture is substantially tangential relative to the direction of rotation of the mixing element, which has a slightly inhibiting effect on the delivery. Alternatively, a rotatable element, such as the rotatable disc 7, may be disposed in the lower half, more in particular in the third part of the mixing blade 6 that is positioned proximate to the bottom of the container. This part of the mixing blade 6 is the most operative part in the delivery of fodder via the delivery opening, so that the metered delivery is improved also when using a mixing blade 6 fitted with a rotatable disc 7 that is present in this operative part. Moreover, a rotatable element in the mixing blade helps to reduce the friction between the fodder and the mixing blade at any position, with the attendant advantages of an improved cutting action and an improved efficiency.

It is noted that in the embodiment of the apparatus and the mixing element as described herein the mixing element 6 functions as a carrier for two partially overlapping discs 7 and 17. It is also possible to use more of such discs, of course, and the discs may also be arranged side by side. One or more discs may be incorporated in the mixing blade, as is shown in FIG. 5 for the disc 17. The radial dimension of one or more discs substantially corresponds to the radial dimension of the mixing blade. This radial dimension of the discs amounts to at least half or more of the radial dimension of the mixing blade at the location of the disc. To reduce the friction between the mixing blade/mixing blades and the feed mixture, the/each mixing blade may be provided with a smooth coating, for example teflon.

Furthermore it is possible to use a helically bent rod or beam as the carrier attached to the column 5 instead of the mixing blade 6, or to use a number of separate supporting arms attached to the column for overlapping, rotatable discs. It is also possible to provide each disc with one or more knives at the circumference thereof.

The invention is not restricted to the embodiment as described in the foregoing, which can be varied in various ways within the scope of the invention as defined in the claims.

The invention claimed is:

1. An apparatus for processing material, comprising:
a container having a bottom and an upright wall,
at least one mixing element comprising:
an upright column rotatably mounted in the container, and
a mixing blade attached to the column, a front edge of which at least is proximate to the bottom of the container, wherein the mixing blade comprises a rotatable disc and wherein the disc at least partly is proximate to the bottom of the container.

2. The apparatus according to claim 1, wherein the rotatable disc is carried by the mixing blade and is disposed at a beginning of the mixing blade near the bottom of the container, wherein a part of a circumferential edge of the rotatable disc forms the front edge and a part of an outer edge of the mixing blade that joins said front edge.

3. The apparatus according to claim 1, wherein the rotatable disc is supported in such a manner that a part of the disc opposite the front edge is positioned higher.

4. The apparatus according to claim 1, wherein the rotatable disc is arranged substantially horizontally.

5. The apparatus according to claim 1, wherein a circumferential part of the rotatable disc is bevelled.

6. The apparatus according to claim 5 wherein the bevelled circumferential part is provided with a number of circumferentially distributed carrier elements.

7. The apparatus of claim 6 wherein the blade comprises a second rotatable disc.

8. The apparatus of claim 7 wherein the blade comprises a helical structure, the second rotatable disc being disposed on the helical structure.

9. The apparatus according to claim 1, wherein the rotatable disc has a sharp outer circumferential edge.

10. The apparatus according to claim 1 and further comprising a second rotatable disc mounted to the mixing blade wherein the second rotatable disc comprises a shaft and wherein a stationary pusher element is mounted to the shaft of the second rotatable disc, which pusher element projects from an upper surface of the second rotatable disc and extends in the direction of the outer circumference thereof.

11. The apparatus according to claim 1, wherein the rotatable disc is provided with a knife edge on an outer circumference thereof.

12. The apparatus according to claim 1, wherein the column of the mixing element is provided with a guide plate near a front edge of the mixing blade, which guide plate extends in a substantially radially outward direction.

13. The apparatus according to claim 12 wherein the guide plate has an arcuate edge at the side that joins the disc.

14. The apparatus according to claim 1, wherein the column of the mixing element is provided with a scraper element at a rear side of the rotatable disc, which scraper element extends in a substantially radially outward direction.

15. The apparatus according to claim 1, wherein the mixing element is provided with a scraper at the location of the rotatable disc, wherein a free end of the scraper extends up to the upright wall of the container.

16. The apparatus according to claim 15, wherein said scraper is mounted under the rotatable disc.

17. The apparatus according to claim 1, wherein two or more rotatable discs are supported on the mixing blade, which discs are arranged in partially overlapping or in side-by-side relationship, with one or more discs being incorporated in the mixing blade.

18. The apparatus according to claim 1, wherein the mixing element comprises at least one mixing arm or second mixing blade, which is provided with a second disc which is rotatably supported on the mixing arm or the second mixing blade, wherein a part of the circumferential edge of the second disc forms a front edge and an outer edge of the mixing arm or the second mixing blade.

19. The apparatus according to claim 18, wherein the second mixing blade has a length of at least 180 degrees.

20. The apparatus according to claim 1, wherein a radial dimension of the rotatable disc amounts to at least half a radial dimension of the mixing blade at the location of the rotatable disc.

21. The apparatus according to claim 20, wherein a radial dimension of one or more rotatable discs is substantially the same as the radial dimension of the mixing blade.

22. The apparatus according to claim 1, and further comprising a second mixing element rotatably mounted in the container, the second mixing element carrying a second rotatable disc, wherein paths of the rotatable disc and the second rotatable disc partially overlap during rotation of the mixing element and the second mixing element.

23. An apparatus for processing material, comprising:
   a container having a bottom and an upright wall; and
   a mixing element rotatably mounted to the container, the mixing element comprising:
      an upright column having a blade attached to the column, wherein a lower portion of the blade is positioned proximate the bottom of the container, which upright column is rotatably mounted in the container;
      a mixing arm fixed to the column; and
      at least one disc rotatably supported on the mixing arm, and wherein part of a circumferential edge of the disc forms a front edge and an outer edge of the mixing arm.

\* \* \* \* \*

UNITED STATES PATENT AND TRADEMARK OFFICE
CERTIFICATE OF CORRECTION

| | | |
|---|---|---|
| PATENT NO. | : 8,414,181 B2 | Page 1 of 1 |
| APPLICATION NO. | : 12/528708 | |
| DATED | : April 9, 2013 | |
| INVENTOR(S) | : Cornelis Hendricus Liet | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 459 days.

Signed and Sealed this
Ninth Day of July, 2013

Teresa Stanek Rea
*Acting Director of the United States Patent and Trademark Office*